US006617017B2

(12) United States Patent
Nihonmatsu et al.

(10) Patent No.: US 6,617,017 B2
(45) Date of Patent: Sep. 9, 2003

(54) FIRING JIG FOR ELECTRONIC ELEMENT

(75) Inventors: Hiroaki Nihonmatsu, Tajimi (JP); Masashi Morisasa, Kani-gun (JP)

(73) Assignees: NGK Insulators, Ltd. (JP); NGK Adrec Co., Ltd. (JP)

( * ) Notice: Subject to any disclaimer, the term of this patent is extended or adjusted under 35 U.S.C. 154(b) by 0 days.

(21) Appl. No.: 09/986,447

(22) Filed: Nov. 8, 2001

(65) Prior Publication Data

US 2002/0134312 A1 Sep. 26, 2002

(30) Foreign Application Priority Data

Nov. 10, 2000 (JP) ........................................ 2000-344314

(51) Int. Cl.$^7$ ................................................. H05B 3/10
(52) U.S. Cl. ........................ 428/325; 428/336; 428/446; 428/697; 428/698; 428/701; 428/702; 219/444.1; 219/548
(58) Field of Search ................................ 428/446, 448, 428/689, 697, 701, 702, 323, 325, 336, 698; 219/444.1, 538, 548

(56) References Cited

FOREIGN PATENT DOCUMENTS

| JP | 402069380 A | * | 3/1990 |
|---|---|---|---|
| JP | 402229776 A | * | 9/1990 |
| JP | 403131584 A | * | 6/1991 |
| JP | 5-178673 | | 7/1993 |
| JP | 406082166 A | * | 3/1994 |
| JP | 6-271374 | | 9/1994 |
| JP | 7-294154 | | 11/1995 |
| JP | 408026960 A | * | 6/1996 |
| JP | 409142968 A | * | 6/1997 |
| JP | 409295872 A | * | 11/1997 |
| JP | 410047868 A | * | 2/1998 |

* cited by examiner

Primary Examiner—Deborah Jones
Assistant Examiner—Stephen Stein
(74) Attorney, Agent, or Firm—Parkhurst & Wendel, L.L.P.

(57) ABSTRACT

This invention provides a firing jig for an electronic element comprising a spray coating layer made of a material less reactive to a material to be fired on a substrate made of a ceramic, wherein two or more spray coating layers are formed on the surface of the substrate, and at least a spray coating layer adjacent to the substrate and a spray coating layer adjacent to the material to be fired are made of different materials. When it is a firing jig for an electronic element comprising a ceramic substrate, a surface adjacent to the substrate is a spray coating layer and the surface of the spray coating layer is a flame coating layer. The firing jig for an electronic element has a longer life and can be produced with a lower cost.

11 Claims, No Drawings

FIRING JIG FOR ELECTRONIC ELEMENT

BACKGROUND OF THE INVENTION AND RELATED ART STATEMENT

This invention relates to a firing jig for an electronic element, which has a long life and allows production with a low cost.

The surface of a firing jig for an electronic element used in firing functional ceramics has been coated with a dense and less reactive coating material for preventing deterioration in properties of a material to be fired due to reaction of a component in the firing jig with the material or absorption of a component in the material in the firing jig.

A frequently used substrate for a firing jig is based on $Al_2O_3$—$SiO_2$. The material is inexpensive and also highly resistant to thermal shock to allows a firing jig to have a longer life, so that it has been widely used as a substrate of a firing jig for an electronic element.

However, although the outer surface of the jig is coated with a dense coating film, repeated firing may cause penetration of $SiO_2$ component in the substrate through the film structure and may remain in the surface of the jig. Thus, the $SiO_2$ component may contaminate a material to be fired and then may adversely affect the properties of an electronic element.

In an alumina-based firing jig, as an $Al_2O_3$ content increases, a coefficient of thermal expansion increases, so that the jig becomes less resistant to thermal shock, leading to a shorter life.

Japanese Patent Laid-Open No. 10-158081 has disclosed that a zirconia flame coating film as a coating film may be formed to a thickness of 300 μm on the surface of an $Al_2O_3$—$SiO_2$-based substrate with an $Al_2O_3$ content of 65% or higher to improve durability; specifically, detachment of the flame coating layer in the jig may be reduced even after repeated cycles of heating and cooling as a firing jig. Such a configuration may prevent detachment of the flame coating layer, but properties of the electronic element placed and fired on the firing jig may be unstable, resulting in little or no increase in a jig life.

In view of the problems in the prior art described above, an objective of this invention is to provide a reliable firing jig for an electronic element by forming two or more spray coating layers on the surface of the substrate in the firing jig and defining some factors such as the contents of required materials for the substrate and individual spray coating layers for improving durability of the firing jig and stabilizing performance of the electronic element placed and fired on the firing jig.

SUMMARY OF THE INVENTION

This invention provides a firing jig for an electronic element comprising a substrate made of a ceramic and a spray coating layer made of a material less reactive to a material to be fired on the substrate, wherein two or more spray coating layers are formed on the surface of the substrate, and at least a spray coating layer adjacent to the substrate and a spray coating layer adjacent to the material to be fired are made of different materials.

In a firing jig for an electronic element according to this invention, it is preferable that the substrate is mainly based on $Al_2O_3$—$SiO_2$, $Al_2O_3$—$SiO_2$—MgO or SiC; the spray coating layer adjacent to the substrate is mainly based on $Al_2O_3$—$SiO_2$, $Al_2O_3$—MgO, $Al_2O_3$—$ZrO_2$ or $Al_2O_3$; and the spray coating layer adjacent to the material to be fired is mainly based on $ZrO_2$, $Al_2O_3$ or $Al_2O_3$—MgO. An $Al_2O_3$ content is preferably 70 to 95 wt % for the substrate, 98 wt % or more for the spray coating layer adjacent to the substrate and 72 to 96 wt % for the total in the substrate and the spray coating layer adjacent to the substrate.

An $SiO_2$ content is preferably 0.5 wt % or less for the spray coating layer adjacent to the substrate and 0.05 to 0.5 wt % for the spray coating layer adjacent to the material to be fired.

In a firing jig for an electronic element according to this invention, a porosity in each of the spray coating layers is preferably 16% or less. The spray coating layers preferably have a crack penetrating each of these layers with a width of 1 to 5 μm. The total thickness of the spray coating layers is preferably 50 to 1000 μm. A particle size in each of the spray coating layers is preferably 300 μm or less.

This invention also provides a firing jig for an electronic element comprising a substrate made of a ceramic and a spray coating layer, wherein a surface adjacent to the substrate is the spray coating layer and the surface of the spray coating layer is a flame coating layer.

DETAILED DESCRIPTION OF PREFERRED EMBODIMENT

A firing jig for an electronic element according to this invention is based on an alumina-silica material, in which performance of the electronic element to be placed and fired on the firing jig may be stabilized by forming two or more spray coating layers on the surface of a substrate and defining the contents of the components required for the substrate and the individual spray coating layers to minimize the amount of $SiO_2$ entering into the coating layer. This invention will be described with reference to, but of course not limited to, embodiments below.

The term, "a firing jig for an electronic element" as used herein means a member used for firing of an electronic element made of a ceramic such as a ceramic capacitor, a thermistor and ferrite, which may comprise, for example, a setter, a case, and a plate for placing a material to be fired.

A firing jig of this invention comprises two or more spray coating layers on the surface of a substrate, where these layers are made of different materials. Thus, the surfaces adjacent to the surface of the substrate and to the material to be fired are spray coating layers with a smaller porosity than that in a flame coating layer to prevent a component adversely affecting a work property or deteriorating the substrate from transferring. Furthermore, if forming a flame coating layer, it may be formed by coating with melted ceramic particles, and thus the layer is a solid hard layer so that expansion or shrinkage cannot be absorbed in the layer, causing detachment. On the other hand, in a spray coating layer, particles are mutually sintered to form a soft layer, allowing intralayer relaxation. When a spray coating layer is formed on the surface of the substrate, the layer can prevent a reactive component in the substrate from being in contact with the material of the electronic element, allowing a silica-alumina material including silica adversely affecting the properties of the electronic element to be used as a substrate.

The term "spray coating" as used herein refers to a process of preparing a ceramic powder slurry for spraying or applying the slurry on the surface of the substrate before firing. The term "work property" refers to dispersion of a dielectric constant generated in an electronic element when firing the electronic element using the firing jig. A good work property in a firing jig means that dispersion property of a dielectric constant is good in an electronic element fired using the firing jig.

The spray coating layers are preferably mainly based on $Al_2O_3$—$SiO_2$, $Al_2O_3$—$SiO_2$—MgO or SiC. It is preferable that the spray coating layer adjacent to the substrate is mainly based on $Al_2O_3$—$SiO_2$, $Al_2O_3$—$MgO$, $Al_2O_3$—$ZrO_2$ or $Al_2O_3$ while the spray coating layer adjacent to the material to be fired is mainly based on $ZrO_2$, $Al_2O_3$ or $Al_2O_3$—$MgO$. Such a configuration may provide a firing jig comprising a substrate with good spall resistance and vent resistance, an intermediate layer preventing a component adversely affecting a material to be fired from transferring and the outer layer less reactive to the material to be fired.

In this invention, an $Al_2O_3$ content is preferably 70 to 95 wt % for the substrate. If the $Al_2O_3$ content of the substrate is less than 70%, a thermal conductivity of the substrate is so reduced that a temperature in the firing jig may significantly vary, leading to an uneven work property on the jig. If the $Al_2O_3$ content of the substrate is more than 95%, a thermal expansion coefficient of the substrate is so increased that a stress due to temperature variation may be significantly increased, leading to crack formation. An $Al_2O_3$ content is preferably 98 wt % or more for the spray coating layer adjacent to the substrate, and the total $Al_2O_3$ content of the substrate and the spray coating layer adjacent to the substrate is preferably 72 to 96 wt %. Furthermore, as described later with reference to Examples, an alumina content of less than 70 wt % in the substrate may improve heat resistance, but relatively increased silica component may adversely affect the properties of an electronic element as a material to be fired. The other alumina contents may be limited within the above range to stabilize the properties of the electronic element.

In the present invention, an $SiO_2$ content is preferably 0.5 wt % or less for the spray coating layer adjacent to the substrate, and 0.05 to 0.5 wt % for the spray coating layer adjacent to the material to be fired. Thus, dispersion of a component adversely affecting a material to be fired by passing through the layer adjacent to the substrate as an intermediate layer can be prevented. Furthermore, the $SiO_2$ content in the layer adjacent to the material to be fired as the outer layer may be limited within the above range so that absorption of $SiO_2$ contained in the material to be fired as a firing aid into the firing jig may be prevented.

In particular, the spray coating layer adjacent to the material to be fired must be made of a material less reactive to the material for the electronic element, but may depend on the type of the electronic element. For example, since the ceramic condenser is made of barium titanate, zirconia less reactive to the material is preferably selected. In this invention, the main component for the coating layer is preferably one or more selected from the group consisting of non-stabilized $ZrO_2$, $Y_2O_3$ stabilized $ZrO_2$, $Y_2O_3$ partially stabilized $ZrO_2$, $CaO$ stabilized $ZrO_2$ and $CaO$ partially stabilized $ZrO_2$.

In this invention, a porosity in each of the spray coating layers is preferably 16% or less. Thus, penetration of a component which may deteriorate a substrate by reacting with the substrate after being dispersed from the work may be blocked by the spray coating layers, and dispersion of $SiO_2$ from the substrate to the outer surface may be prevented in firing of a ceramic capacitor, resulting in improved stability in an electronic element.

The spray coating layers preferably have a crack penetrating each of these layers with a width of 1 to 5 $\mu$m. In firing of a ceramic capacitor or ferrite, whose outer surface is often made of zirconia, as the number of passing through a kiln increases, residual expansion characteristic in zirconia may be generated. Since it may cause curving or detachment in a firing jig, it is effective that a crack as defined above exists as a room for absorbing such residual expansion.

The total thickness of the spray coating layers is preferably 50 to 1000 $\mu$m. Furthermore, as described later in Examples, if the thickness is less than 50 $\mu$m, properties of an electronic element fired on the firing jig may vary, while if it is more than 1000 $\mu$m, detachment between layers in the firing jig may be often caused when firing an electronic element using the firing jig. The layer adjacent to the substrate must firmly adhere to the substrate. It is preferable that the surface of a lower layer is coarser for firm adhesion of the lower layer to the layer adjacent to the material to be fired, and coarse particles may be appropriately added to the layer adjacent to the substrate as an intermediate layer to make the surface rough, which is suitable to stably hold a layer deposited on the surface layer. However, if an excessive amount of coarse particles or excessively large particles are used, an adhesive strength in the intermediate layer may be reduced, causing detachment. Furthermore, when the layer adjacent to the material to be fired as the outer layer is spray-coated, the use of excessively large particles is not preferable because it may reduce an adhesive strength with the lower layer and detachment may be caused as described above. A particle size in each of the spray coating layers is preferably 300 $\mu$M or less.

In this invention, an intermediate layer is baked during spray coating and thus blasting of a substrate or preheating before forming the intermediate layer may be not necessarily required for preventing detachment of the intermediate layer from the substrate.

In a firing jig for an electronic element comprising a ceramic substrate of this invention, the surface adjacent to the substrate may be a spray coating layer, whose surface may be a flame coating layer. In this jig, the surface layer is a flame coating layer while the surface adjacent to the substrate is a spray coating layer. Thus, thermal expansion or shrinkage of the substrate and the flame coating layer may be absorbed. It may prevent deformation of the basedue to detachment of the flame coating layer or residual expansion in the flame coating layer.

The term "flame coating" as used herein refers to a process for forming a flame coating film by melting metal or ceramic fine powder (hereinafter, referred to as "flame coating material") by heating and then spraying it onto an object. There may be variations such as gas flame coating using flame and arc flame coating using arc depending on a heating method. In this invention, it is preferable to form an outer flame coating film by plasma flame coating using a plasma jet.

In this invention, particularly preferable plasma flame coating is water-stabilized plasma flame coating. The minimum film thickness of a flame coating film by gas plasma flame coating is about 20 to 50 $\mu$m because a thick coating film with the minimum film thickness of about 100 $\mu$m may be formed by water-stabilized plasma flame coating. Since water-stabilized plasma flame coating may form a coating film with a relatively porous and coarse surface, it is also preferable in terms of improvement of adhesiveness to the surface of the spray coating layer adjacent to the substrate.

This invention will be more specifically described with reference to, but not limited to, Examples.

EXAMPLES 1 TO 9 AND COMPARATIVE EXAMPLES 1 TO 5

A material consisting of $Al_2O_3$ to a content shown in Table 1 and $SiO_2$ and $MgO$ as the remaining components was pressed and fired to form a plate with the dimensions of a 200 mm (length)×200 mm (width)×5 mm (thickness) as a substrate. A firing temperature was appropriately varied in the light of an alumina content. On the surface of the substrate were formed a spray coating layer adjacent to the substrate (made of $Al_2O_3$, thickness: 100 $\mu$m) and a spray coating layer adjacent to the material to be fired (made of $ZrO_2$, thickness: 100 $\mu$m) by spray coating to produce a firing jig. Alternatively, on the surface of the substrate were formed a spray coating layer adjacent to the substrate by spray coating and a flame coating layer adjacent to the material to be fired by plasma flame coating to produce a firing jig.

Table 1 shows component(s) for a substrate and an alumina content in each example; processes used for forming a layer adjacent to a substrate and a layer adjacent to a material to be fired; and the results obtained.

(Evaluation procedures)
(1) Spalling test

On the above jig was evenly applied alumina abrasive grains with an average particle size of 2 mm and it was repeatedly passed through a roller hearth kiln under the conditions of the maximum temperature of 1300° C. and 9 hrs from an inlet to an outlet (warming: 3 hrs, retention: 3 hrs, cooling: 3 hrs). Then, presence of cracks generated by thermal spall and a length of a crack were determined.

(2) Reaction curving test

On the jig was applied a solution of barium titanate as a dielectric, and it was repeatedly fired in a small electric furnace at 1400° C. for 2 hours to determine the firing number until an intermediate layer (or a coating layer) was detached from the substrate or a crack was generated due to curving of the jig.

(3) Detachment test

This test was conducted as described in the above reaction curving test.

(4) Work property test

On the above jig was placed a barium titanate sheet formed by a doctor-blade method. After firing it in a small electric furnace at 1350° C. for 2 hours, a dielectric constant was determined.

ceramic substrate exhibited satisfactory function as a firing jig for an electronic element even when the substrate was made of $Al_2O_3$—$SiO_2$—MgO as long as its $Al_2O_3$ content was within the range of 70 to 95 wt %. Similar results were obtained for a substrate based on SiC without $Al_2O_3$.

Evaluation is herein indicated in the tables according to the following rating: T: very good,;: good, Δ: slightly insufficient, x: insufficient.

EXAMPLES 10 TO 12 AND COMPARATIVE EXAMPLES 6 AND 7

Firing jigs were produced as described in Examples 1 to 9, except that a $Al_2O_3$—$SiO_2$ material with an $Al_2O_3$ content of 85% was used for a substrate; the layers adjacent to the substrate (thickness: 100 μm) and to the material to be fired (thickness: 100 μm) were formed using spray coating layers; and the layer adjacent to the substrate was made of $Al_2O_3$. Table 2 shows an $Al_2O_3$ content in the layer adjacent to the substrate and the evaluation results.

TABLE 2

| | Layer adjacent to a substrate | Evaluation | | |
|---|---|---|---|---|
| | $Al_2O_3$ content (%) | Reaction curving | Detachment | Work property |
| Example 10 | 99.9 | ; | T | T |
| Example 11 | 99.0 | ; | T | T |
| Example 12 | 98 | ; | T | ; |
| Comparative | 97.9 | ; | ; | Δ |

TABLE 1

| | Substrate | | Method for forming a layer adjacent to a substrate | Method for forming a layer adjacent to a material to be fired | Evaluation | | | |
|---|---|---|---|---|---|---|---|---|
| | Material | $Al_2O_3$ content (%) | | | Spalling | Reaction curving | Detachment | Work property |
| Comparative Example 1 | $Al_2O_3$—$SiO_2$ | 85 | Flame coating | Flame coating | ; | x | ; | ; |
| Example 1 | $Al_2O_3$—$SiO_2$ | 85 | Spray | Flame coating | ; | ; | T | T |
| Example 2 | $Al_2O_3$—$SiO_2$ | 85 | Spray | Spray | ; | T | T | T |
| Example 3 | $Al_2O_3$—$SiO_2$—MgO | 85 | Spray | Spray | T | ; | ; | T |
| Example 4 | SiC | — | Spray | Spray | T | T | ; | ; |
| Comparative Example 2 | $Al_2O_3$—$SiO_2$ | 65 | Spray | Spray | T | ; | ; | x |
| Comparative Example 3 | $Al_2O_3$—$SiO_2$ | 69 | Spray | Spray | T | ; | ; | Δ |
| Example 5 | $Al_2O_3$—$SiO_2$ | 70 | Spray | Spray | T | T | T | ; |
| Example 6 | $Al_2O_3$—$SiO_2$—MgO | 80 | Spray | Spray | T | T | T | T |
| Example 7 | $Al_2O_3$—$SiO_2$ | 80 | Spray | Spray | T | T | T | T |
| Example 8 | $Al_2O_3$—$SiO_2$ | 90 | Spray | Spray | ; | T | T | T |
| Example 9 | $Al_2O_3$—$SiO_2$ | 95 | Spray | Spray | ; | T | T | ; |
| Comparative Example 4 | $Al_2O_3$—$SiO_2$ | 96 | Spray | Spray | Δ | ; | T | ; |
| Comparative Example 5 | $Al_2O_3$—$SiO_2$ | 100 | Spray | Spray | x | ; | T | ; |

(Evaluation)

As shown in Table 1, reaction curving was observed in Comparative Example 1 in which the layer adjacent to the substrate is a flame coating layer. Comparative Examples 2 and 3 in which an $Al_2O_3$ content of the substrate is less than 70% exhibited a poor work property, while Comparative Examples 4 and 5 in which the content is more than 95% exhibited poor spalling property.

A jig where a spray coating layer and further spray coating and flame coating layers were formed on the surface of the TABLE 2-continued

| | Layer adjacent to a substrate | Evaluation | | |
|---|---|---|---|---|
| | $Al_2O_3$ content (%) | Reaction curving | Detachment | Work property |
| Example 6 Comparative Example 7 | 97 | ; | ; | x |

(Evaluation)

As shown in Table 2, a work property was insufficient in Comparative Examples 6 and 7, in which an $Al_2O_3$ content was less than 98% in the spray coating layer adjacent to the substrate. It might be because a work property was adversely affected by a relatively large (2% or more) amount of $SiO_2$ coexisting with $Al_2O_3$ in the coating layer adjacent to the substrate.

EXAMPLES 13 TO 21 AND COMPARATIVE EXAMPLES 8 AND 9

Firing jigs were produced as described in Examples 1 to 9, except that a material shown in Table 3 was used for a substrate; the layers adjacent to the substrate (thickness: 100 μm) and to the material to be fired (thickness: 100 μm) were formed using spray coating layers; and the layer adjacent to the substrate was made of a material shown in Table 3.

Table 3 shows a material and an $Al_2O_3$ content in the substrate, a material for the layer adjacent to the substrate, a total $Al_2O_3$ content in the substrate and the layer adjacent to the substrate, and the evaluation results.

TABLE 3

| | Substrate | | Layer adjacent to the substrate Material | Total $Al_2O_3$ content (%) | Evaluation | | | |
|---|---|---|---|---|---|---|---|---|
| | Material | $Al_2O_3$ content (%) | | | Spalling | Reaction curving | Detachment | Work Property |
| Comparative Example 8 | $Al_2O_3$—$SiO_2$ | 70 | $Al_2O_3$ | 71 | T | ; | Δ | Δ |
| Example 13 | $Al_2O_3$—$SiO_2$ | 70 | $Al_2O_3$ | 72 | T | T | ; | ; |
| Example 14 | $Al_2O_3$—$SiO_2$—MgO | 80 | $Al_2O_3$ | 81 | T | T | T | T |
| Example 15 | $Al_2O_3$—$SiO_2$ | 80 | $Al_2O_3$ | 81 | T | T | T | T |
| Example 16 | $Al_2O_3$—$SiO_2$ | 80 | $Al_2O_3$—MgO | 81 | T | T | T | ; |
| Example 17 | $Al_2O_3$—$SiO_2$ | 80 | $Al_2O_3$—$ZrO_2$ | 81 | T | T | T | ; |
| Example 18 | $Al_2O_3$—$SiO_2$ | 80 | $Al_2O_3$ | 82 | T | T | T | T |
| Example 19 | $Al_2O_3$—$SiO_2$ | 85 | $Al_2O_3$ | 86 | ; | T | T | T |
| Example 20 | $Al_2O_3$—$SiO_2$ | 90 | $Al_2O_3$ | 91 | ; | ; | T | ; |
| Example 21 | $Al_2O_3$—$SiO_2$ | 95 | $Al_2O_3$ | 96 | ; | ; | ; | ; |
| Comparative Example 9 | $Al_2O_3$—$SiO_2$ | 95 | $Al_2O_3$ | 97 | Δ | ; | ; | ; |

(Evaluation)

As shown in Table 3, detachment and work property results were insufficient in Comparative Example 8 in which the total $Al_2O_3$ content in the substrate and the spray coating layer adjacent to the substrate was less than 72%. It might be because an inadequate $Al_2O_3$ content in the substrate reduced a thermal conductivity of the substrate to make a work property in the jig uneven and to increase a thermal expansion difference between the substrate and the spray coating layer so that tendency to detachment was increased. In addition, spalling was insufficient in Comparative Example 9 in which the total $Al_2O_3$ content was more than 96%. It might be because increase in the total $Al_2O_3$ content in the substrate caused increase in thermal expansion, leading to the insufficient spalling result.

The results show that even $Al_2O_3$—MgO or $Al_2O_3$—$ZrO_2$ may be used as a material for the spray coating layer adjacent to the substrate to provide a good firing jig for an electronic element as long as the total $Al_2O_3$ content in the substrate and the spray coating layer adjacent to the substrate is within the defined range.

EXAMPLES 22 TO 28 AND COMPARATIVE EXAMPLE 10

Firing jigs were produced as described in Examples 1 to 9, except that a $Al_2O_3$—$SiO_2$ material with an $Al_2O_3$ content of 80% was used for a substrate; the layers adjacent to the substrate (thickness: 100 μm) and to the material to be fired (thickness: 100 μm) were formed using spray coating layers; and the layer adjacent to the substrate was made of a material shown in Table 4.

Table 4 shows a material and an $SiO_2$ content of the layer adjacent to the substrate, and the evaluation results.

TABLE 4

| | Layer adjacent to the substrate | | Evaluation | | |
|---|---|---|---|---|---|
| | Material | $SiO_2$ content (%) | Spalling | Detachment | Work property |
| Comparative Example 10 | $Al_2O_3$ | 0.60 | Δ | ; | Δ |
| Example 22 | $Al_2O_3$ | 0.50 | ; | ; | ; |
| Example 23 | $Al_2O_3$ | 0.30 | ; | T | ; |
| Example 24 | $Al_2O_3$—MgO | 0.30 | ; | ; | ; |
| Example 25 | $Al_2O_3$—$ZrO_2$ | 0.30 | ; | ; | ; |
| Example 26 | $Al_2O_3$ | 0.10 | T | T | T |
| Example 27 | $Al_2O_3$ | 0.05 | T | T | T |
| Example 28 | $Al_2O_3$ | 0.01 | T | T | T |

(Evaluation)

As shown in Table 4, reaction curving and work property results were insufficient in Comparative Example 10 in which the $SiO_2$ content in the spray coating layer adjacent to the substrate was more than 0.5%. The results also show that even $Al_2O_3$-MgO or $Al_2O_3$—$ZrO_2$ may be used as a material for the spray coating layer adjacent to the substrate to provide a good firing jig for an electronic element as long as a $SiO_2$ content in the spray coating layer adjacent to the substrate is within the defined range.

EXAMPLES 29 TO 34 AND COMPARATIVE EXAMPLE 11

An $Al_2O_3$—$SiO_2$ material with an $Al_2O_3$ content of 85% was pressed and fired at 1500° C. to give a plate with the dimensions of 140 mm (length)×140 mm (width)×5 mm (thickness), which was used as a substrate. On the plate member was sprayed slurried alumina or mullite particles, and the plate was fired at 1450° C. to form a spray coating layer adjacent to the substrate. On the layer was formed a layer adjacent to a material to be fired using yttria-stabilized zirconia, alumina-magnesia spinel or alumina by spray coating or plasma flame coating. The product was evaluated for its curving and detachment after repeating a durability test three times. A test product as a comparative example was prepared by forming a layer adjacent to the substrate using alumina as a material by plasma flame coating, forming thereon a layer adjacent to a material to be fired using yttria-stabilized zirconia as a material similarly by plasma flame coating and then firing the product. Table 5 shows the results.

(Evaluation)

As shown in Table 5, reaction curving was insufficient in Comparative Example 11 ($\geq 2$ mm) in which the layer adjacent to the substrate was formed by flame coating. When the layer adjacent to the substrate was formed by spray coating, the layer adjacent to a material to be fired as a surface layer could be either a spray coating or flame coating layer to exhibit good reaction curving and detachment results even when the latter layer was made of any material of yttria-stabilized zirconia, alumina-magnesia spinel and alumina.

EXAMPLES 35 TO 42 AND COMPARATIVE EXAMPLES 12 TO 15

An $Al_2O_3$—$SiO_2$ material with an $Al_2O_3$ content of 85% was pressed and fired at 1500° C. to give a plate with the dimensions of 140 mm (length)×140 mm (width)×5 mm (thickness), which was used as a substrate. On the plate member was sprayed slurried alumina particles with an $Al_2O_3$ content of 99.9%, and the plate was fired at 1450° C. to form a spray coating layer adjacent to the substrate. On the layer was formed a layer adjacent to a material to be fired using yttria-stabilized zirconia with an $SiO_2$ content of 0.03 to 0.7% by spray coating. The plate was fired to produce a firing jig.

On each sample was placed a barium titanate sheet and then it was fired, at the end of which dispersion of a dielectric constant was determined for evaluating dispersion in a work property. The product was evaluated for its curving and detachment after repeating a durability test three times. Table 6 shows the results.

TABLE 5

| | Layer adjacent to the substrate | | Layers adjacent to a material to be fired | | Evaluation | |
|---|---|---|---|---|---|---|
| | Material | Process | Material | Process | Curving | Detachment |
| Example 29 | Alumina | Spray* | Yttria-stabilized zirconia | Spray | None | None |
| Example 30 | Alumina | Spray | Yttria-stabilized zirconia | Flame coating | None | None |
| Example 31 | Alumina | Spray | Alumina-magnesia spinel | Spray | None | None |
| Example 32 | Alumina | Spray | Alumina-magnesia spinel | Flame coating | None | None |
| Example 33 | Mullite | Spray | Alumina | Spray | None | None |
| Example 34 | Mullite | Spray | Alumina | Flame coating | None | None |
| Comparative Example 11 | Alumina | Flame coating** | Yttria-stabilized zirconia | Flame coating | $\geq 2$ mm | None |

*Spray: Spray coating
**Flame coating: Plasma flame coating

TABLE 6

| | Layer adjacent to a material to be fired SiO₂ content (%) | Evaluation Dispersion of a work property | Duration test Curving | Duration test Detachment |
|---|---|---|---|---|
| Comparative Example 12 | 0.03 | Small | None | Observed |
| Comparative Example 13 | 0.04 | Small | None | Observed |
| Example 35 | 0.05 | Small | None | None |
| Example 36 | 0.06 | Small | None | None |
| Example 37 | 0.07 | Small | None | None |
| Example 38 | 0.1 | Small | None | None |
| Example 39 | 0.2 | Small | None | None |
| Example 40 | 0.3 | Small | None | None |
| Example 41 | 0.4 | Small | None | None |
| Example 42 | 0.5 | Small | None | None |
| Comparative Example 14 | 0.6 | Medium | None | None |
| Comparative Example 15 | 0.7 | Large | None | None |

(Evaluation)

As shown in Table 6, detachment was observed in Comparative Examples 12 and 13 in which an SiO₂ content was less than 0.05% in the spray coating layer adjacent to a material to be fired, while dispersion in a capacitance was insufficient in Comparative Examples 14 and 15, in which an SiO₂ content was more than 0.5%. Good results for a capacitance, reaction curving and detachment were obtained in the other samples where an SiO₂ content was within the defined range.

EXAMPLES 43 TO 48 AND COMPARATIVE EXAMPLES 16 TO 19

An $Al_2O_3$—$SiO_2$ material with an $Al_2O_3$ content of 85% was pressed and fired at 1550° C. to give a plate with the dimensions of 140 mm (length)×140 mm (width)×5 mm (thickness), which was used as a substrate. On the plate member was sprayed slurried alumina particles with an average particle size of 10 μm or 90 μm, and the plate was fired at 1300° C. or 1550° C., respectively to form a spray coating layer adjacent to the substrate having a different porosity. On the layer was formed a layer adjacent to a material to be fired using yttria-stabilized zirconia by spray coating. The plate was fired to produce a firing jig. For a comparative example, a layer adjacent to the substrate was formed as a flame coating layer with a different porosity by plasma flame coating varying a size of alumina particles. The results are shown in Table 7.

TABLE 7

| | Layer adjacent to the substrate Process | Porosity (%) | Evaluation Curving | Evaluation Detachment |
|---|---|---|---|---|
| Example 43 | Spray* | 0.2 | None | None |
| Example 44 | Spray | 1.7 | None | None |
| Example 45 | Spray | 3.5 | None | None |
| Example 46 | Spray | 8 | None | None |
| Example 47 | Spray | 11 | None | None |
| Example 48 | Spray | 16 | None | None |
| Comparative Example 16 | Spray | 18 | Observed | None |
| Comparative Example 17 | Flame coating** | 21 | Observed | None |
| Comparative Example 18 | Flame coating | 26 | Observed | Observed |
| Comparative Example 19 | Flame coating | 30 | Observed | Observed |

*Spray: Spray coating
**Flame coating: Plasma flame coating (Evaluation)

When forming a layer adjacent to the substrate by spray coating, good curving and detachment results were obtained in a durability test because the layer had a smaller porosity, i.e., less voids, than a layer formed by plasma flame coating.

EXAMPLES 49 TO 51 AND COMPARATIVE EXAMPLES 20 TO 22

An $Al_2O_3$—$SiO_2$ material with an $Al_2O_3$ content of 90% was pressed and fired at 1550° C. to give a plate with the dimensions of 140 mm (length)×140 mm (width)×5 mm (thickness), which was used as a substrate. On the plate member was sprayed slurried alumina particles with an $Al_2O_3$ content of 99.9%, and the plate was fired at 1500° C. to form a spray coating layer adjacent to the substrate. On the layer was formed a layer adjacent to a material to be fired using yttria-stabilized zirconia with an SiO₂ content of 0.05 to 0.70% by spray coating. The plate was fired at 1500° C. to produce a firing jig. The results are shown in Table 8.

TABLE 8

| | Void (μm) | Curving after a durability test (the number of repetition) 3 | 6 | 9 | Detachment after a durability test (the number of repetition) 3 | 6 | 9 |
|---|---|---|---|---|---|---|---|
| Example 49 | 1 | None | None | Observed | None | None | None |
| Example 50 | 3 | None | None | None | None | None | None |
| Example 51 | 4 | None | None | None | None | None | None |
| Comparative Example 20 | 7 | None | None | None | None | None | Observed |
| Comparative Example 21 | 10 | None | None | None | None | Observed | Observed |

TABLE 8-continued

|  | Void ($\mu$m) | Curving after a durability test (the number of repetition) | | | Detachment after a durability test (the number of repetition) | | |
|---|---|---|---|---|---|---|---|
|  |  | 3 | 6 | 9 | 3 | 6 | 9 |
| Comparative Example 22 | 20 | None | None | None | None | Observed | Observed |

(Evaluation)

In a product in which a crack with a width of 1 to 5 $\mu$m could be formed penetrating layers adjacent to the substrate and adjacent to a material to be fired after producing as described above, zirconia residual expansion was absorbed in the layer adjacent to a material to be fired, resulting in delay of detachment generation.

EXAMPLES 52 TO 61 AND COMPARATIVE EXAMPLES 23 TO 27

An $Al_2O_3$—$SiO_2$ material with an $Al_2O_3$ content of 85% was pressed and fired at 1500° C. to give a plate with the dimensions of 140 mm (length)×140 mm (width)×5 mm (thickness), which was used as a substrate. On the plate member was sprayed slurried alumina particles with an $Al_2O_3$ content of 99.9%, and the plate was fired at 1450° C. to form a spray coating layer adjacent to the substrate. On the layer was formed a layer adjacent to a material to be fired using yttria-stabilized zirconia with an $SiO_2$ content of 0.05 to 0.70% by spray coating. The plate was fired at 1450° C. to produce a firing jig.

In Examples, spray coating was conducted independently varying the thicknesses of the layers adjacent to the substrate and to a material to be fired for evaluating effects of the thicknesses on the properties of a fired material and detachment. The results are shown in Table 9.

TABLE 9

|  | Thickness of a spray coating layer | | | | |
|---|---|---|---|---|---|
|  | Layer adjacent to the substrate ($\mu$m) | Layer adjacent to a material to be fired ($\mu$m) | Total thickness ($\mu$m) | Property test Dispersion in a work property | Durability test Detachment |
| Comparative Example 23 | 0 | 30 | 30 | Large | None |
| Comparative Example 24 | 10 | 30 | 40 | Medium | None |
| Example 52 | 20 | 30 | 50 | Small | None |
| Example 53 | 50 | 50 | 100 | Small | None |
| Example 54 | 100 | 100 | 200 | Small | None |
| Example 55 | 100 | 200 | 300 | Small | None |
| Example 56 | 200 | 300 | 500 | Small | None |
| Example 57 | 300 | 400 | 700 | Small | None |
| Example 58 | 300 | 500 | 800 | Small | None |
| Example 59 | 400 | 500 | 900 | Small | None |
| Example 60 | 500 | 500 | 1000 | Small | None |
| Example 61 | 300 | 700 | 1000 | Small | None |
| Comparative Example 25 | 400 | 700 | 1100 | Small | Observed |
| Comparative Example 26 | 500 | 700 | 1200 | Small | Observed |
| Comparative Example 27 | 600 | 700 | 1300 | Small | Observed |

(Evaluation)

As shown in Table 9, a dispersion in a work property of a fired material was increased in Comparative Examples 23 and 24, in which the total thickness of the spray coating layers was less than 50 $\mu$m, while a detachment result was insufficient in Comparative Examples 25, 26 and 27, in which the thickness was more than 1000 $\mu$m. It was because an excessively small total thickness of two layers, i.e., the spray coating layers adjacent to the substrate and to a material to be fired, adversely affected the fired material so that component dispersion could not be prevented. On the other hand, an excessively large total thickness might reduce adhesiveness of the substrate to the spray coating layer adjacent to the substrate in relation to the thickness, resulting in detachment.

When the total thickness of the spray coating layers was within the defined range, results for dispersion in a work property and detachment were sufficient.

EXAMPLES 62 TO 65 AND COMPARATIVE EXAMPLES 28 AND 29

An $Al_2O_3$—$SiO_2$ material with an $Al_2O_3$ content of 85% was pressed and fired at 1550° C. to give a plate with the dimensions of 140 mm (length)×140 mm (width)×5 mm (thickness), which was used as a substrate. On the plate member was sprayed slurried alumina particles with the maximum particle size of 80 $\mu$m to 500 $\mu$m containing alumina fine powder, and the plate was fired at 1500° C. to form a spray coating layer adjacent to the substrate. On the layer was formed a layer adjacent to a material to be fired using yttria-stabilized zirconia by spray coating. The plate was fired at 1500° C. to produce a firing jig. The results are shown in Table 10.

TABLE 10

|  | Layer adjacent to the substrate Maximum particle size of $Al_2O_3$ ($\mu$m) | Durability test Detachment |
|---|---|---|
| Example 62 | 80 | None |
| Example 63 | 120 | None |
| Example 64 | 250 | None |
| Example 65 | 300 | None |
| Comparative Example 28 | 400 | Observed |
| Comparative Example 29 | 500 | Observed |

(Evaluation)

As shown in Table 10, a detachment result was insufficient in Comparative Examples 28 and 29, in which a particle size in each spray coating layer was larger than 300 $\mu$m. When the particle size was within the defined range, good results were obtained for detachment.

As described above, in a firing jig for an electronic element according to this invention, two or more spray coating layers are formed on the surface of the substrate in the firing jig and contents of materials required are defined for the substrate and the individual spray coating layers so that durability of the firing jig can be improved and performance of an electronic element placed and fired on the firing jig can be stabilized.

What is claimed is:

1. A firing jig for an electronic element comprising a substrate made of a ceramic and a spray coating layer made of a ceramic material less reactive to a ceramic material to be fired on the substrate, wherein two or more spray coating layers are formed on the surface of the substrate, and at least a spray coating layer adjacent to the substrate and a spray coating layer adjacent to the ceramic material to be fired are made of different ceramic materials and wherein a porosity in each of the spray coating layers is 16% or less.

2. The firing jig for an electronic element according to claim 1, wherein the substrate is mainly based on $Al_2O_3$—$SiO_2$, $Al_2O_3$—$SiO_2$—$MgO$ or $SiC$; the spray coating layer adjacent to the substrate is mainly based on $Al_2O_3$—$SiO_2$, $Al_2O_3$—$MgO$, $Al_2O_3$—$ZrO_2$ or $Al_2O_3$; and the spray coating layer adjacent to the material to be fired is mainly based on $ZrO_2$, $Al_2O_3$ or $Al_2O_3$—$MgO$.

3. The firing jig for an electronic element according to claim 1, wherein an $Al_2O_3$ content in the substrate is 70 to 95 wt %.

4. The firing jig for an electronic element according to claim 1, wherein an $Al_2O_3$ content in the spray coating layer adjacent to the substrate is 98 wt % or more.

5. The firing jig for an electronic element according to claim 1, wherein the total $Al_2O_3$ content in the substrate and the spray coating layer adjacent to the substrate is 72 to 96 wt %.

6. The firing jig for an electronic element according to claim 1, wherein an $SiO_2$ content in the spray coating layer adjacent to the substrate is 0.5 wt % or less.

7. The firing jig for an electronic element according to claim 1, wherein an $SiO_2$ content in the spray coating layer adjacent to the material to be fired is 0.05 to 0.5 wt %.

8. The firing jig for an electronic element according to claim 1, wherein the spray coating layers have a crack penetrating each of these layers with a width of 1 to 5 $\mu$m.

9. The firing jig for an electronic element according to claim 1, wherein the total thickness of the spray coating layers is 50 to 1000 $\mu$m.

10. The firing jig for an electronic element according to claim 1, wherein a particle size in each of the spray coating layers is 300 $\mu$m or less.

11. A firing jig for an electronic element comprising a substrate made of a ceramic and a spray coating layer made of a ceramic material, wherein a surface adjacent to the substrate is the spray coating layer made of particles having a maximum particle size within a range of from 80 to 300 $\mu$m and the surface of the spray coating layer is a flame coating layer made of a ceramic material.

* * * * *